Nov. 12, 1935.   J. VON ISSENDORFF   2,020,922
ARRANGEMENT IN RECTIFYING AND INVERTING SYSTEMS
HAVING RARE GAS OR MERCURY VAPOR DEVICES
Filed Jan. 14, 1933
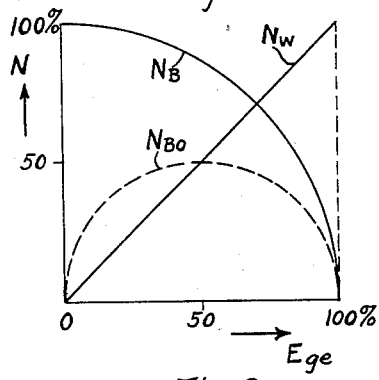
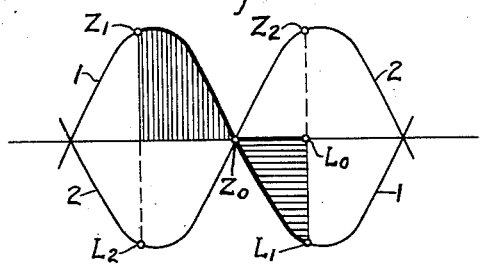
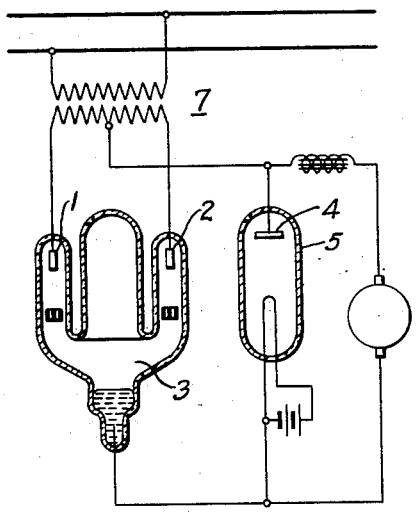
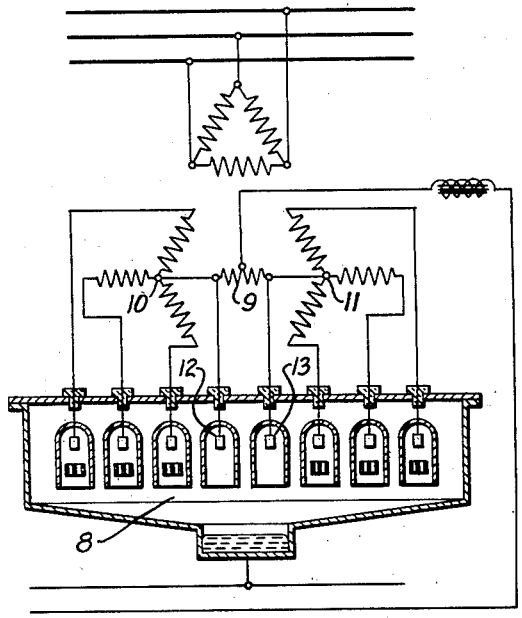
WITNESSES:
INVENTOR
Jürgen von Issendorff.
BY
ATTORNEY Patented Nov. 12, 1935

2,020,922

UNITED STATES PATENT OFFICE 2,020,922

ARRANGEMENT IN RECTIFYING AND INVERTING SYSTEMS HAVING RARE GAS OR MERCURY VAPOR DEVICES

Jürgen von Issendorff, Berlin-Siemensstadt, Germany, assignor to Westinghouse Electric & Manufacturing Company, New York, N. Y., a corporation Application January 14, 1933, Serial No. 651,720
In Germany January 26, 1932

2 Claims. (Cl. 175—363)

My invention relates to an arrangement in rectifying and inverting systems having rare gas or mercury vapor devices which are provided with control electrodes for controlling the power and are connected to a single or multi-phase alternating current supply circuit through transformers in single phase-single path, single phase-double path or multiple phase connections.

Grid-controlled rare gas or mercury vapor rectifiers permit a practically ideal control of the rectified voltage, if the time of the ignition of the positive half wave of the anode voltage is retarded with the aid of the control grid. They cause out-of-phase currents in the alternating current supply circuit so that the power factor will be the smaller, the closer the control voltage is to zero value. The magnitude of the consumed reactive power is shown in Fig. 1 in which the direct-current voltage $E_{G1}$ expressed in percentage of its maximum value is plotted as abscissa against the effective power $Nw$ and the reactive power $Nb$ as ordinate in the case of a constant supply of direct current also expressed in percentage of its maximum value. The considerable reactive power must be produced in some cases by special wattless current generating devices; for instance, condensers.

According to the present invention the above disadvantage is practically overcome, if the neutral points or the star points of the transformer winding (reactors or the like) are connected to particular star point anodes. The star point anodes are preferably arranged in the rectifier proper since they alternate with the other anodes when conducting current. A reconstruction of the rectifiers in existing systems would involve expenses. In this case the star point anodes may also be arranged in discharge tubes operating in parallel relation with the rectifier.

Figure 1 is a diagrammatic illustration of the reactive power drawn by a rectifier with and without the star point connection.

Fig. 2 is a diagrammatic illustration of the voltages and currents applied to the rectifier.

Fig. 3 is a schematic illustration of a simplified embodiment of my invention; and Fig. 4 is a schematic illustration of a preferred embodiment of my invention.

The operation of the new system is illustrated in the accompanying drawing. In Fig. 2 the curves 1 and 2 represent the voltages supplied by the transformer to the main anodes of a single phase- (two-path) rectifier with respect to the star point (center) of the transformer winding. By applying positive voltages to the grids, the main anodes will be ignited in the moments $Z_1$ and $Z_2$. From the point $Z_1$ the anode 1 conducts direct current which is smoothed to a certain extent by inductances in the direct-current circuit, which current is at least to be considered as flowing steadily. The anode retains the current until the quenching point $L_1$ which as regards time is in agreement with the ignition point $Z_2$. In this case, two different voltage ranges are to be considered: a shaded area with vertical lines denoting the active voltage and a shaded area with horizontal lines denoting the braking voltage. The useful rectifier voltage is proportional to the difference of both areas. The area lying below the zero line denotes power of considerable amount which flows back and is useless in itself and as reactive power it is in fact very disadvantageous in the case of the supply of controlled rectifier power.

The star point anode according to the invention as shown in the connection of Fig. 3 is always rendered active, if its voltage with respect to the cathode is more positive than the voltage of the main anode (1) active in that moment. This occurs in point $Z_0$ as indicated in Fig. 2. In this case, the star point anode takes up the total current which would otherwise flow through anode 1 as a result of the accumulative effect of the smoothing means (inductance) in spite of a negative transformer voltage up to the ignition point $Z_2$. The anode 1 extinguishes, therefore, already in the ignition point $Z_0$. The ignition of the following anode 2 will not be by any means impaired thereby. The anode 2 easily takes up the current in the ignition point $Z_2$ so that the star point anode in the quenching point $L_0$ is deenergized. The passages of current require naturally a certain time (time for the commutation) which may be disregarded, since it is extremely short. The advantage of this operation lies in the fact that the return of energy is avoided and the reactive power is, therefore, considerably reduced. Fig. 1 illustrates the resultant reactive power $N_{B0}$ when operating with a star point anode. The reactive power is, consequently, reduced in average to the half amount, if a single phase rectifier is carried out with star point anode. In multi-phase connections, the advantage is not so great, but it may be nevertheless considerable, if the control is chiefly necessary in the field of very small direct current voltages as this is, for instance, the case when starting direct-current motors.

Two embodiments of my invention are shown in Figs. 3 and 4. Fig. 3 discloses a control rectifier 3 having two extensions wherein the anodes 1 and 2 are disposed. The star point anode 4 to be connected to the secondary star point of the transformer 7 is arranged in a gas- or vapor-filled thermionic tube 5. Fig. 4 illustrates a six-phase rectifier 8 with a reactor 9. In this case, both three-phase star points 10 and 11 are connected each to an auxiliary anode 12 and 13.

Also in this case the return of energy through the rectifier to the alternating current supply circuit or in general during the conversion of direct current into alternating current, it is possible to attain a saving in the reactive current with the aid of star point anodes. Here, the reactive power consumption is the greater, the smaller the direct-current voltage supplied as compared to the voltage proper of the rectifier. The return of energy is characterized by retarded ignition of the anode voltages so that the shaded area lying below the zero line (Fig. 2) is greater than the shaded area lying above the zero line. In order to avoid the reactive power, the positive area is made as small as possible by effecting the ignition of the main anode shortly before the voltage passes the zero value. The ignited anode then burns until the current is taken over by the star point anode ignited at any time whatever which star point anode in turn supplies the current to the following main anode. In this case the star point anode will not, therefore, ignite in point $Z_0$ but later. The negative area may be of any desired extension, whereas the positive surface remains always small so that the return of power may be controlled with the smallest possible consumption of reactive power.

If the direct current voltage differs greatly from zero either in the case of a supply or return of power, a smaller number of star point anodes are active in conducting current. In the case of multiple phase rectifiers the conduction of current may under circumstances cease entirely; for instance, in the case of a simple six-phase rectifier already at the half normal voltage of the rectifier. The star point at the same time is then always negative with respect to the cathode and might also under circumstances conduct backfiring currents. Therefore, it is preferable to automatically check the star point anodes, if they are provided with control grids, by means of continuous negative grid voltages.

A further advantage of the above-described device lies in the fact that the ripple of the low rectifier voltages is considerably slighter than with control rectifiers without star point anodes. In the case of a single phase rectifier, the direct current voltage supplied varies as shown in Fig. 2 according to $Z_1$, $Z_0$, $L_0$, $Z_2$ with star point anode and to $Z_1$, $Z_0$, $L_1$, $L_0$, $Z_2$ without star point anode. The ripples show as a whole a similar behavior as the reactive powers in Fig. 1. The result is that the smoothing reactor in the direct current circuit may be designed with considerably smaller dimensions and that the direct current motors supplied with energy communicate better and the copper losses are reduced. Furthermore, the copper losses of the rectifier transformer are considerably smaller when using star point anodes, since the secondary windings do not need to conduct temporarily any current.

The above-described arrangement is preferably applied to such cases in which very small partial voltages of the rectifier voltages must be controlled; that is to say, during the starting of motor drives, particularly in such cases in which great starting currents are to be supplied and a single phase supply is involved; for instance, in the case of rectifier locomotives. Here, the saving in weight of wattless current condensers and smoothing reactances is very important.

I claim as my invention:—

1. An electrical conversion system comprising a polyphase alternating-current supply, a direct-current load circuit, energy storing devices in said direct-current circuit, a vapor electric converter for transferring energy between said supply and said load, a double-three-phase transformer having phase terminals for connection to said converter, main valves in said converter corresponding to said phase terminals and auxiliary valves in said converter connected to the Y points in said transformer.

2. An electrical conversion system comprising a polyphase alternating-current supply, a direct-current load circuit, energy storing devices in said direct-current circuit, a vapor electric converter for transferring energy between said supply and said load, a double-three-phase transformer having phase terminals for connection to said converter, main valves in said converter corresponding to said phase terminals, control grids for each of said main valves, and auxiliary valves connected to the star points of said transformer for improving the power factor of the converter load.

JÜRGEN VON ISSENDORFF.